(12) United States Patent
Krech

(10) Patent No.: US 12,339,186 B2
(45) Date of Patent: Jun. 24, 2025

(54) MEASURING DEVICE FOR ARRANGING IN A CYLINDRICAL INTERIOR SECTION OF A HOLLOW BODY

(71) Applicant: core sensing GmbH, Darmstadt (DE)

(72) Inventor: Martin Krech, Mühltal (DE)

(73) Assignee: core sensing GmbH, Darmstadt (DE)

( * ) Notice: Subject to any disclaimer, the term of this patent is extended or adjusted under 35 U.S.C. 154(b) by 262 days.

(21) Appl. No.: 18/016,783

(22) PCT Filed: Jul. 15, 2021

(86) PCT No.: PCT/EP2021/069849
§ 371 (c)(1),
(2) Date: Jan. 18, 2023

(87) PCT Pub. No.: WO2022/017928
PCT Pub. Date: Jan. 27, 2022

(65) Prior Publication Data
US 2023/0288275 A1    Sep. 14, 2023

(30) Foreign Application Priority Data

Jul. 24, 2020   (DE) ............... 10 2020 119 655.5

(51) Int. Cl.
*G01L 5/00*     (2006.01)
*G01C 21/16*    (2006.01)
(Continued)

(52) U.S. Cl.
CPC ............ *G01L 5/0004* (2013.01); *G01C 21/16* (2013.01); *G01L 1/22* (2013.01)

(58) Field of Classification Search
CPC ......... G01L 1/2231; G01L 1/18; G01L 23/10; G01L 9/0075; G01L 5/047; G01L 1/2225;
(Continued)

(56) References Cited

U.S. PATENT DOCUMENTS

| | | | |
|---|---|---|---|
| 3,861,203 A | 1/1975 | Dahle et al. | |
| 5,402,689 A | 4/1995 | Grogan | |

(Continued)

FOREIGN PATENT DOCUMENTS

| | | | |
|---|---|---|---|
| DE | 279311 A1 | 5/1990 | |
| DE | 102010027959 A1 | 10/2011 | |

(Continued)

*Primary Examiner* — Brandi N Hopkins
(74) *Attorney, Agent, or Firm* — Smartpat PLC

(57) ABSTRACT

A measuring device for arranging in tubular cavities of machine elements has a deformation body with a deformation region. A respective press-in ring element is secured to two opposite ends of the deformation body. The deformation body can be introduced into a tubular cavity of a machine element through a press-in opening using a press-in force such that mechanical effects acting on the machine element can extend to the deformation region by the press-in ring elements and can be detected by a sensor secured to the deformation region. The press-in ring elements have a ring element thickness that is so low that the deformation body can be reliably introduced into the tubular cavity and can be stored therein in a force-fitting manner while the cavity circumference of the tubular cavity is designed to have a non-circular shape, or has high tolerance variations, such as those found in pipes for example.

15 Claims, 7 Drawing Sheets

(51) Int. Cl.
  *G01L 1/22*      (2006.01)
  *G01L 1/26*      (2006.01)
  *G01L 5/22*      (2006.01)

(58) Field of Classification Search
  CPC ..... G01L 5/108; G01L 5/1627; G01L 5/0004;
                G01L 1/22; G01L 3/10; G01G 3/141;
            G01G 19/4142; G01B 5/08; G01C 21/16;
                A63B 24/00; B62M 3/08; B62M 6/50
  See application file for complete search history.

(56)           References Cited

U.S. PATENT DOCUMENTS

| 2008/0184818 | A1  | 8/2008 | Lifvenborg |
| 2013/0024137 | A1  | 1/2013 | Grassi |
| 2018/0128697 | A1* | 5/2018 | Groche ................... G01L 5/168 |

FOREIGN PATENT DOCUMENTS

| DE | 102015106933 A1 | 11/2016 |
| WO |   2013012870 A1 |  1/2013 |

* cited by examiner

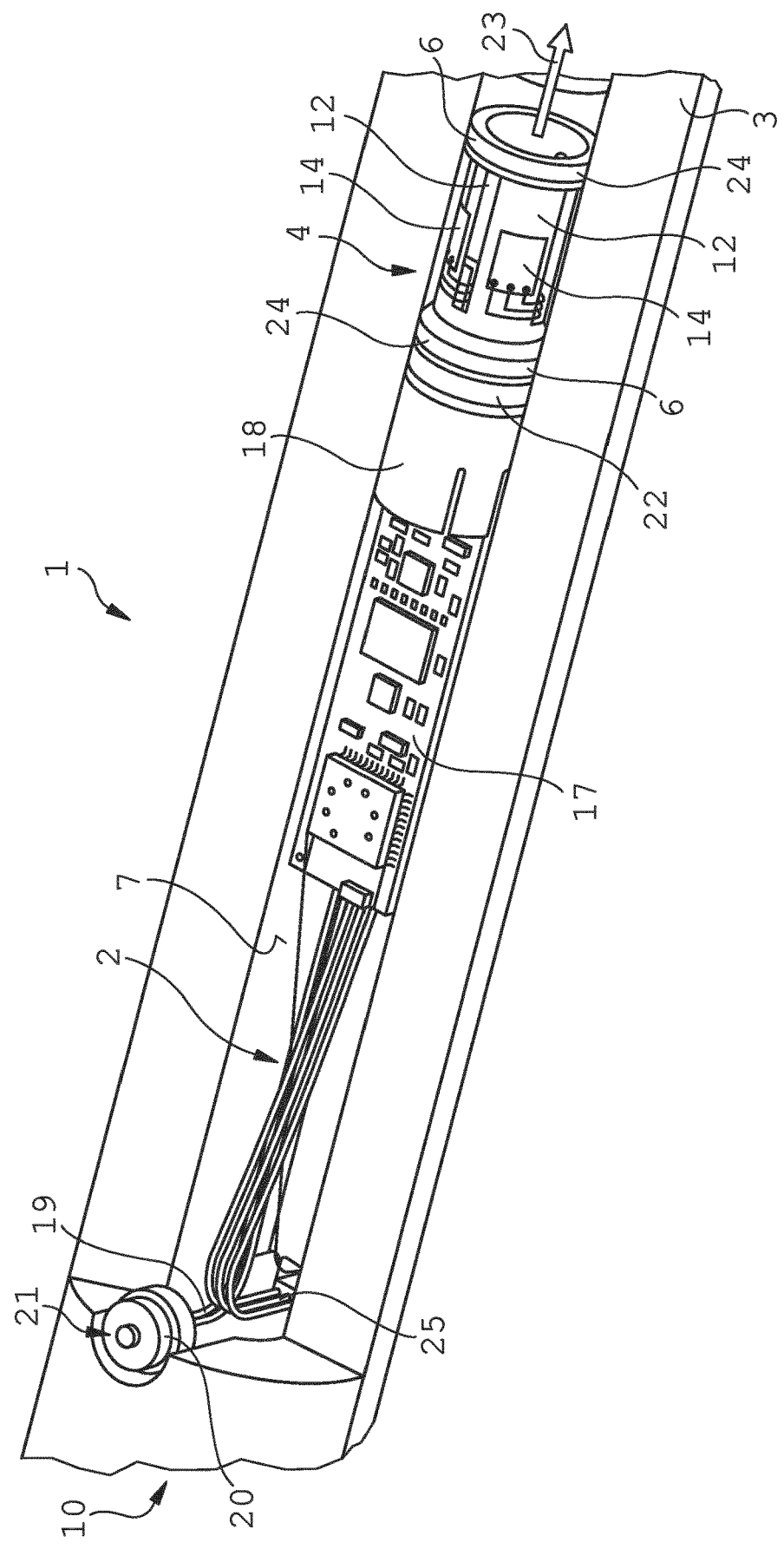

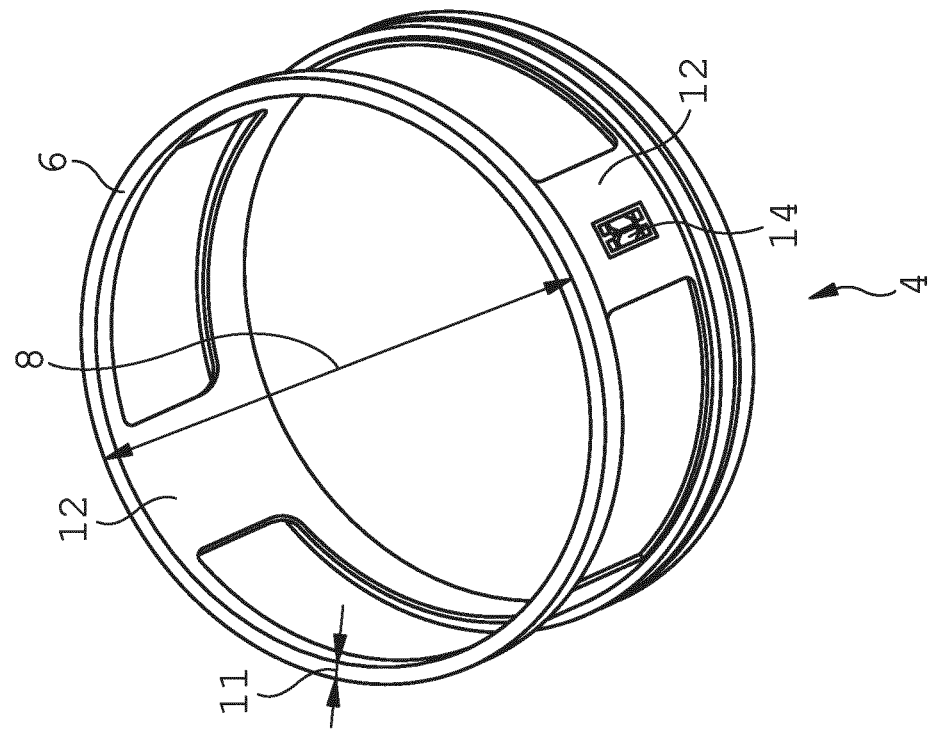
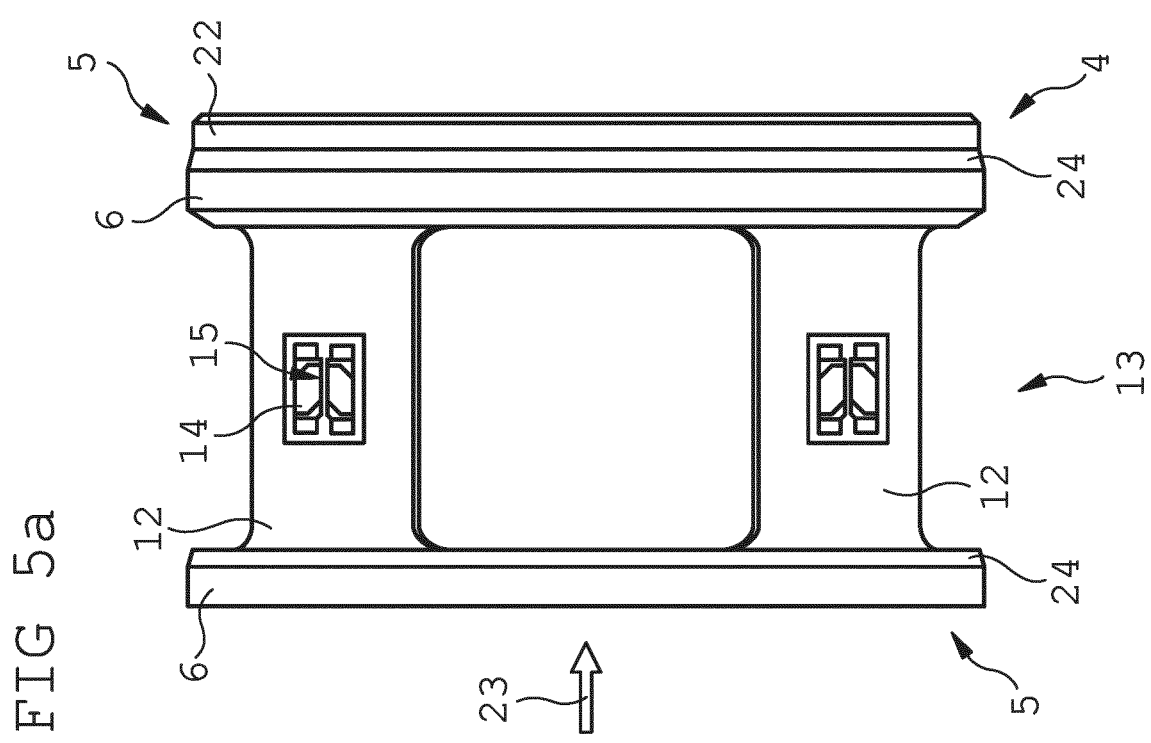
FIG 5a

MEASURING DEVICE FOR ARRANGING IN A CYLINDRICAL INTERIOR SECTION OF A HOLLOW BODY

TECHNICAL FIELD

The disclosure relates to a measuring device for detecting a mechanical stress on a hollow body having a cylindrical interior section.

BACKGROUND

Modern technologies are known from practice that are called the Internet of Things or Industry 4.0, for example, and have the aim, among others, of networking physical objects, individual machine components or entire systems and having them work together automatically with the help of information and communication technologies. The networked and cooperating components should thus be able to be controlled and monitored more efficiently and in a more targeted manner, wherein the productivity of the resources used can be increased. A necessary prerequisite for the successful use of these technologies is the detection of the relevant physical measured variables for the individual components. On the basis of these measured variables, machine elements or processes can be monitored or controlled and, for example, predictive maintenance of machines and systems can be carried out. These predictions can focus on the current load or utilization of the component and the functionality of the machine or system, so that imminent failures can be recognized at an early stage or possible causes of faults in the system can be identified more easily. Similarly, the physical measured variables can also be detected for controlling a motor as a function of a load exerted by a human, so that a hand-guided, electrically assisted vehicle, for example, can be operated in an assisting manner.

In many areas of application, intelligent machine elements or plant components are required in which the relevant physical measured variables can be detected and transmitted as digital information to a data-processing device. Examples of the relevant physical measured variables can be forces acting on the machine elements, torques, position parameters or speeds.

As an example of an intelligent component, a torque sensor is described in WO 2013/012870 A1, which is accommodated in a spindle, at the respective opposite ends of which a crank arm can be attached, wherein the torque sensor detects the forces and torques acting on the spindle from the crank arms by means of strain gauges and processes them in electronics. The force-fitting fixing of a torque sensor in a cylindrical interior of a hollow body, such as a pedal crank, regularly requires a fit in the hollow body that is as precise as possible, into which the sleeve-shaped torque sensor can be pressed. Due to the usually unavoidable manufacturing tolerances of tubular hollow bodies, such as welded, drawn or pressed tubes, a shaping of an inner wall of the hollow body is not specified with sufficient precision, so that a sleeve-shaped or rod-shaped sensor body cannot easily be fixed in the interior of the hollow body in a force-fitting manner and a separate fit is always required.

Various exemplary applications for press-in sensors are also known from practice, in which a pill-shaped measuring device is pressed into a corresponding fit in a form-fitting manner, which fit is e.g. inserted into a press frame. The demands on precision in the manufacture of both the fit and the sleeve-shaped sensor bodies that have to be pressed into the fit are high and result in correspondingly high manufacturing costs. In addition, a fit can only be introduced in regions of the machine component that are directly accessible from the outside, so that a spatial arrangement of the torque sensors on the machine components is considerably restricted. For example, the arrangement of a torque sensor at a distance from the end faces in the interior of a tubular hollow body is regularly not possible, as no suitable fit can be formed in the cylindrical interior section. This is in particular the case if it is a welded, drawn or pressed piece of pipe that, with the technically possible manufacturing tolerances, does not have sufficient basic accuracy for a press connection and also excludes further machining due to roundness deviations, wall thickness variations and eccentricity in the pipe region.

DE 10 2015 106 933 A1 describes a way of arranging and fixing a torque sensor in the interior of a tubular hollow body. However, the tubular hollow body has to be manufactured with a special process and suitable tools, and at the same time the torque sensor has to be fixed in the interior, which makes the manufacture of the hollow body very complex. In addition, the torque sensor cannot be placed at any position within an already manufactured tubular hollow body, so that the placement of torque sensors in certified hollow bodies, which must be manufactured according to a certified process, is not possible.

SUMMARY

It is an object of the disclosure to provide a measuring device for detecting a mechanical load of a hollow body, which can be placed robustly and cost-effectively in tubular cavities of semi-finished products or machine elements with high tolerances.

This object is achieved by a measuring device for detecting a mechanical stress on a hollow body having a cylindrical interior section. The measuring device has a deformation body that can be fixed in a force-transmitting manner in the cylindrical interior section and has a deformation region and a sensor device, which is fixed in the deformation region and can detect a mechanical stress transmitted to the deformation body due to the mechanical stress of the hollow body and thereby forced deformation of the deformation region. An elastically deformable press-in ring element is arranged at two respective opposite ends of the deformation body and the press-in ring element has a ring element thickness in at least some regions that is so low that the press-in ring element adapts to an inner wall of the hollow body and is pressed in a force-fitting manner against the inner wall, so that a mechanical stress on the hollow body is transmitted via the press-in ring elements to the deformation body and causes a deformation of the deformation region of the deformation body that can be detected by the sensor device. The ring element thickness corresponds to a distance measured in a radial direction between a radially inner press-in ring element inner surface and a radially outer press-in ring element outer surface.

The measuring device has a deformation body having press-in ring elements arranged thereon, by means of which the deformation body can be non-positively fixed in a cylindrical interior section of a hollow body without requiring a precisely predetermined interference fit. The deformation body is inserted into the interior of the hollow body with the press-in ring elements and arranged in the desired region or in the specified interior section. This is achieved, for example, by pressing in the end face with, but also without, thermal shrinkage, i.e. an additional temperature adjustment of the joining partners. The elastically deformable press-in ring elements adapt to the course of the inner wall of the hollow body and generate a sufficiently high contact pressure on the inner wall so that the deformation body is fixed in the interior of the hollow body in a force-fitting manner via the press-in ring elements and a mechanical stress of the hollow body is transferred to the deformation body of the measuring device. The hollow body has an at least approximately cylindrical interior or cavity. Due to the low ring element thickness, the press-in ring elements can adapt to a circumferential course of the inner wall that is ideally not circular but irregular due to tolerances and rather is oval, for example. The ring element thickness is expediently specified in such a way that a deformation and adaptation to the surrounding inner wall that changes the shape of the press-in ring elements is possible and at the same time a sufficiently high restoring force is generated with which the contact pressure of the respective press-in ring element against the surrounding inner wall is effected.

It is advantageous if the press-in ring elements or the deformation body are made of the same material as the hollow body, so that temperature differences do not lead to significantly different expansions of the press-in ring elements and the hollow body, thereby weakening the force-fitting connection between the press-in ring elements and the surrounding hollow body or impairing it to such an extent that accurate measurement with the measuring device is no longer possible.

The seamless and force-fitting connection between the measuring device and the hollow body has the effect that mechanical forces acting on the hollow body are transmitted directly to the deformation region of the deformation body by the press-in ring elements, so that the sensor device can detect the mechanical forces acting on the deformation region as physical measured variables via the deformation of the deformation body in the deformation region caused thereby.

Particularly advantageously, it can be provided that the low ring element thickness of the press-in ring elements relative to a respective ring element diameter of the press-in ring elements is predetermined in a range of 3% to 25%. Due to the small thickness of the ring elements, the press-in ring elements have a large elastic deformation capacity. During a pressing-in process, the press-in ring elements can exploit an elastic deformation capacity up to an elastic limit.

In addition, the press-in ring elements may be made of a suitable material that, when subjected to forced deformation beyond the elastic limit, allows plastic deformation before there is any fear of damage to the press-in ring elements. The elastic limit is also known from practice as the yield point of a material. The press-in ring elements can exploit an elastic deformation capacity up to an elasticity limit in order to enable a plastic deformation of the press-in ring elements beyond this. In this way, the press-in ring elements can exploit their inherent full elastic deformation capacity for a radial force-fitting connection, regardless of a given condition of the interior section of the hollow body. The subsequent possible plastic deformation enables a further and even higher radial adaptability of the press-in ring elements to an inner wall of the interior section of the hollow body.

Shape changes of the press-in ring elements of an additional 200% to 300% compared to elastic shape changes can easily be achieved with a suitable choice of material. The reduced ring element thickness, at least in some regions, in the range of 3% to 25% advantageously allows the press-in ring elements to be adapted to almost all practically relevant tubular hollow bodies with an at least approximately cylindrical interior section. Depending on the proportion of the one circumferential portion or the plurality of circumferential portions with a small ring element thickness relative to a total circumference of the press-fit ring element, the restoring force of the elastically deformable press-in ring element can be predetermined within a wide range and thereby individually adapted to the respective hollow body. The higher the ring element thickness, the stiffer the press-in ring element and the higher the restoring force of the press-in ring element and thus the contact pressure of the press-in ring element against the surrounding inner wall of the hollow body. Optionally, with a favorable design of the press-in ring elements, a targeted strain hardening of the press-in ring elements can thus also be effected when they are radially deformed, which increases the mechanical stability of the measuring device in the hollow body.

It is advantageous for many applications that both press-in ring elements have the same ring element diameter. In order to be able to fix the measuring device, for example, in a conically tapered interior of a hollow body, however, it is also conceivable that the two press-in ring elements each have an individual and differing ring element diameter. Optionally, it is also possible that in the case of a different inner contour, for example in the case of an oval profile cross-section of the hollow body, the press-in ring elements have a profile corresponding to the profile cross-section.

Ideally, the radial stiffness of the press-in ring elements is set high enough so that the required force-fitting connection can be maintained over the intended service life of the hollow body or the measuring device. With the highest possible contact pressure of the press-in ring elements against the inner wall of the tubular hollow body, which, however, allows damage-free insertion of the measuring device into the interior of the hollow body, a linear response behavior of the measuring device can be made possible over a wide measuring range of the measuring device. This can facilitate the evaluation of the sensor signals of the measuring device and, if necessary, also achieve more accurate measurement results.

In order to better ensure a damage-free pressing-in process of the measuring device, according to a particularly advantageous embodiment of the invention it can be provided that the end of the deformation body lying in the pressing-in direction has at least one contact surface projecting radially inwards relative to a longitudinal axis of the deformation body, so that the measuring device can be pressed into the interior section in the pressing-in direction with a press-in tool bearing against the at least one projecting contact surface.

During the pressing-in process, considerable press-in forces usually have to be exerted on the measuring device, especially on the deformation body and the deformation region. The press-in forces can even become considerably greater than the mechanical stresses to be detected by the sensor device and acting on the deformation region, so that it is possible that the deformation region and the sensor device are permanently deformed or damaged during the pressing-in process and to the detriment of intended use if the press-in forces act on the end of the deformation body that penetrates last into the hollow body and is opposite the pressing-in direction.

With the contact surface formed according to the embodiment, which lies within the deformation body and projects radially to its longitudinal axis, a press-in tool can attach to the contact surface and press in the measuring device or the deformation body at the end lying in the pressing-in direction, so that only reduced tensile forces and no compressive press-in forces act on the deformation region and the sensor device. The contact surface can encompass the entire circumference of the deformation body or only consist of individual or a plurality of contact surfaces in sections along the circumference.

The press-in tool then has a smaller diameter than the inner diameter of the deformation body, and can be designed, for example, as a press-in mandrel or a press-in punch, so that the press-in tool can press against the contact surface(s) through the deformation body.

When the hollow body is stressed, the force transmission of the press-in ring elements to the deformation body can advantageously be converted into a deformation of the deformation body if the deformation region of the deformation body consists of thin-walled deformation webs connecting the two press-in ring elements, to which the sensor device is fixed. If the deformation region consists of deformation webs or if the press-in ring elements are connected via these deformation webs to form a deformation body, which may be of one-piece design, the forces transmitted via the press-in ring elements from the surrounding hollow body to the deformation body are concentrated on the deformation webs and can cause greater deformation of the individual deformation webs than, for example, in the case of a sleeve-shaped deformation region between the two press-in ring elements, which is comparatively stiff. The arrangement of four or six deformation webs between the two press-in ring elements is considered to be particularly advantageous, as the deformation region is thus designed to be torsionally soft and a particularly large deformation of the deformation region of the deformation body formed by the deformation webs can be achieved by the mechanical effects on the hollow body.

The design of the webs as thin-walled cross-sections with a small cross-sectional area, which is advantageous for detecting the stress variables, results in low rigidity, which is beneficial for the sensor properties, but makes the pressing-in process more difficult. When pressing in, there must be no overstressing of the axial compressive strength or buckling stability if the force transmission is directed via the deformation webs during pressing in. For this reason, measures can be taken that lead to a reduction of the necessary press-in force.

According to a particularly advantageous design of the thin-walled deformation webs, it can be provided that the deformation webs connecting the two press-fit ring elements are tapered in at least some regions along a respective longitudinal axis of the deformation webs. This design of the deformation webs causes an increase in stress on the strain gauges attached to the deformation webs, wherein the stiffness of the deformation webs is also reduced. This also significantly improves the linearity of the targeted measuring range, as the strain gauge has to detect less deformation or strain when forces are acting in the same way.

For easier and non-destructive insertion of the measuring device, it can be provided that at least one circumferential edge of each of the two press-in ring elements has a press-in chamfer, so that the deformation body can be introduced into the cylindrical interior of the hollow body with the press-in chamfer of the press-in ring elements in front. The press-in chamfer is expediently formed in a press-in direction on the same peripheral edge of each of the two press-in ring elements, so that it is easier to insert and press in the measuring device, which is pressed into the interior in the pressing-in direction. For this purpose, the press-in chamfer has a very low inclination, so that a high wedge effect is created during the press-in process. This means that a low press-in force can cause a high radial force. This ensures that the initial press-in force necessary to ensure the larger outer diameter of the press-in ring elements to the shaping of the inner contour of the interior section is so low that buckling of the deformation body is avoided.

For an additionally facilitated centering of the measuring device at the beginning of the insertion into the hollow body, it can optionally be provided that a centering ring element with a smaller diameter than the ring element diameter is fixed to at least one end face of the deformation body, so that the centering ring element can be introduced more easily into the cylindrical interior of the hollow body and provides advantageous positioning and alignment of the press-in ring element that is subsequently pressed into the cylindrical interior. A centering ring element at at least one end of the deformation body also has the effect that the deformation body has a greater axial extension and that there is less risk during the pressing-in process that the deformation body will tilt in the interior of the tubular hollow body, while the pressing-in force exerted on the deformation body during the pressing-in process in the interior of the hollow body does not have to be increased.

According to an advantageous design of the concept of the invention, it can be provided that a diameter of the deformation region is lower than the ring element diameter of the press-in ring elements. A radially inward offset arrangement of the deformation region causes an outer surface of the deformation region to be spaced from the inner wall of the surrounding hollow body. This enables an uncomplicated arrangement of sensor elements on the outer surface of the deformation region without the sensor elements resting against the inner wall of the tubular cavity and thereby being crushed and/or damaged. The deformation region can thus be completely decoupled from the inner wall of the hollow body and is only connected to it via the press-in ring elements.

For advantageous detection of mechanical effects on the hollow body, it can optionally be provided for the measuring device that the sensor device comprises strain gauges, wherein the strain gauges are fixed in the deformation region of the deformation body and optionally on the deformation webs. Strain gauges are known to be well suited to detect and make the mechanical forces acting on the strain gauges measurable through their electrical resistance changing with pressure or strain. A plurality of strain gauges can be fixed, aligned and connected to the deformation region or the deformation webs of the deformation region in such a way that the acting mechanical forces can be separated and evaluated separately according to their respective proportions in bending forces, torques and axial forces. Any interfering force components, or force components that are not relevant for a specified evaluation, can thus be compensated or faded out in a simple manner so that, for example, only torques acting on the hollow body are detected and measured by the sensor device. Optionally, it is also possible to connect two strain gauges mounted opposite one another on the deformation webs to form a full bridge or a Wheatstone bridge, so that undesirable force components and measured variables can be compensated for when evaluating the measured values.

The processing of the measured variables can be achieved particularly advantageously in the measuring device if the measuring device comprises an electronic processing device, which prepares and processes measurement signals from the sensor device. The electronic processing device can be measurement electronics or a printed circuit board with a microcontroller, for example. The electronic processing device can already pre-process, filter and/or perform calculations with the acquired measured variables. This allows the measured variables to be acquired at a high sampling rate, while the transmission of information can take place with reduced, pre-processed data. In addition, an electronic processing device with a microcontroller can, for example, actuate actuators or send information with data transmission devices as soon as the detected measured variables exceed or fall below certain limit values.

The measuring device can advantageously be supplied with electrical energy if the measuring device has an electrical supply line with a plug connector with which the electronic components of the measuring device can be permanently supplied with electrical energy. The plug connector may protrude from the hollow body, for example, at an end face or through a recess in a lateral surface of the hollow body, so that the measuring device can be supplied with electrical energy via the plug connector.

Optionally and particularly advantageously, the measuring device can have an electrical energy store so that the electronic components of the measuring device can be supplied with electrical energy without an external energy supply for a limited time or depending on a state of charge of the electrical energy store. This allows the measuring device to be operated self-sufficiently in terms of energy, as a time-limited interruption of the electrical supply from outside the hollow body can be bridged with the energy store. Depending on the demand for electrical energy and the available space in the interior of the hollow body, accumulators or capacitors are suitable as energy stores. As an option for charging the energy store by means of a plug connector, the energy store can also be charged contactlessly by means of an induction coil. This can eliminate the need for a plug connector and wired contact with an external power supply.

It is also possible that the measuring device has a device for converting kinetic energy into electrical energy, with which the energy store can be filled with electrical energy. Such a design of the measuring device is particularly advantageous when using the measuring device in hollow bodies that are regularly or continuously moved during their intended use, as is the case, for example, with rotating hollow shafts.

So that the measuring device can be operated as self-sufficiently as possible in terms of energy, it can optionally be provided that a permanent-magnet rotor is fixed to a generator weight, wherein the generator weight and the permanent-magnet rotor are mounted inside the measuring device by means of rolling bearings, so that a rotational movement of the measuring device about the permanent-magnet rotor mounted in rolling bearings can generate an electrical voltage in at least one coil winding fixed to the rotatable measuring device. This means that the measuring device can be encapsulated in the hollow body without the need for externally supplied electrical energy and thus be self-sufficient in terms of energy, and can be operated without a mechanically contacting connection with the environment. An electrical energy store can be attached to the electronics, which continuously charges the electrical energy store through rotational movement, while the electronic processing device can be supplied from the electrical energy store when stationary. Additional electronic circuits can process and/or smooth the voltage induced by the permanent magnet rotor before it is used in the measuring device.

For communication and transmission of the measurement signals, according to an advantageous design of the measuring device, it can be provided that the measuring device has a radio transmission module with which wireless communication can take place. For this purpose, the radio transmission module can establish a communication channel to a receiver outside of the hollow body, with which information about physical measured variables, for example, can be transmitted to the receiver. According to a particularly advantageous embodiment, the radio transmission module can have an antenna countersunk in a transverse bore so that the mechanical robustness of the entire system is guaranteed and no damage can occur to the electronic components, even in the event of mechanical effects on the hollow body.

According to one embodiment of the invention, it can be particularly advantageous for communication and transmission of the measurement signals that a recess is made in the hollow body, into which recess an antenna device adapted to the recess and mounted on a printed circuit board is fitted, wherein the antenna device is enclosed by a sleeve sealing the recess. The recess can again be a transverse hole or transverse bore running transversely to the longitudinal axis of the hollow body. A particularly effective radiation characteristic of the antenna device is advantageous here, without contaminating the interior section with dirt from the outside.

In both embodiments, the communication and transmission of the measurement signals can advantageously take place via Bluetooth (low energy), which ensures a certain compatibility with smartphones and tablets.

For rotating applications of the measuring device, it can be advantageously provided that the measuring device has a balance receptacle with which a compensating mass element can be fixed to the deformation body. Optionally, an otherwise asymmetrical mass distribution of the measuring device can be compensated by at least one compensating mass element, wherein the balancing receptacle preferably encapsulates the at least one compensating mass element. The imbalance receptacle can advantageously consist of plastic.

Further possible applications can arise for the measuring device if the measuring device has at least one inertial measurement unit that can record rotation rate and/or acceleration measurement values. From the rotation rate and/or acceleration measurement values, the electronic processing device can, for example, calculate and provide location positions, rotational speeds or other calculated characteristics such as energy or power. Advantageously, the inertial measuring unit can be arranged at a radial distance of 5 mm to 30 mm from the axis of rotation of the measuring device, so that a rotation of the measuring device leads to appreciable accelerations that can then be converted into a rotational speed. Furthermore, a sensor fusion from the various sensor sources (strain gauges, inertial measuring unit) in a microcontroller accommodated in the measuring device can be used to carry out decentralized calculations in advance to identify the states of the machine components—e.g. the announcement of necessary maintenance of a Cardan shaft or an intention recognition of operating handles.

The measuring device is shown below as an example in schematic diagrams.

BRIEF DESCRIPTION OF THE DRAWINGS

FIG. 4 shows a perspective view of a further measuring device in a hollow body, also shown partially cut, which has a smaller diameter than the hollow body shown in FIG. 1.

FIG. 5a shows a side view and a perspective view of a deformation body of the measuring body having two press-in ring elements formed respectively at two ends of the deformation body, having a centering ring element and two press-in chamfers.

DETAILED DESCRIPTION

Figure 1:
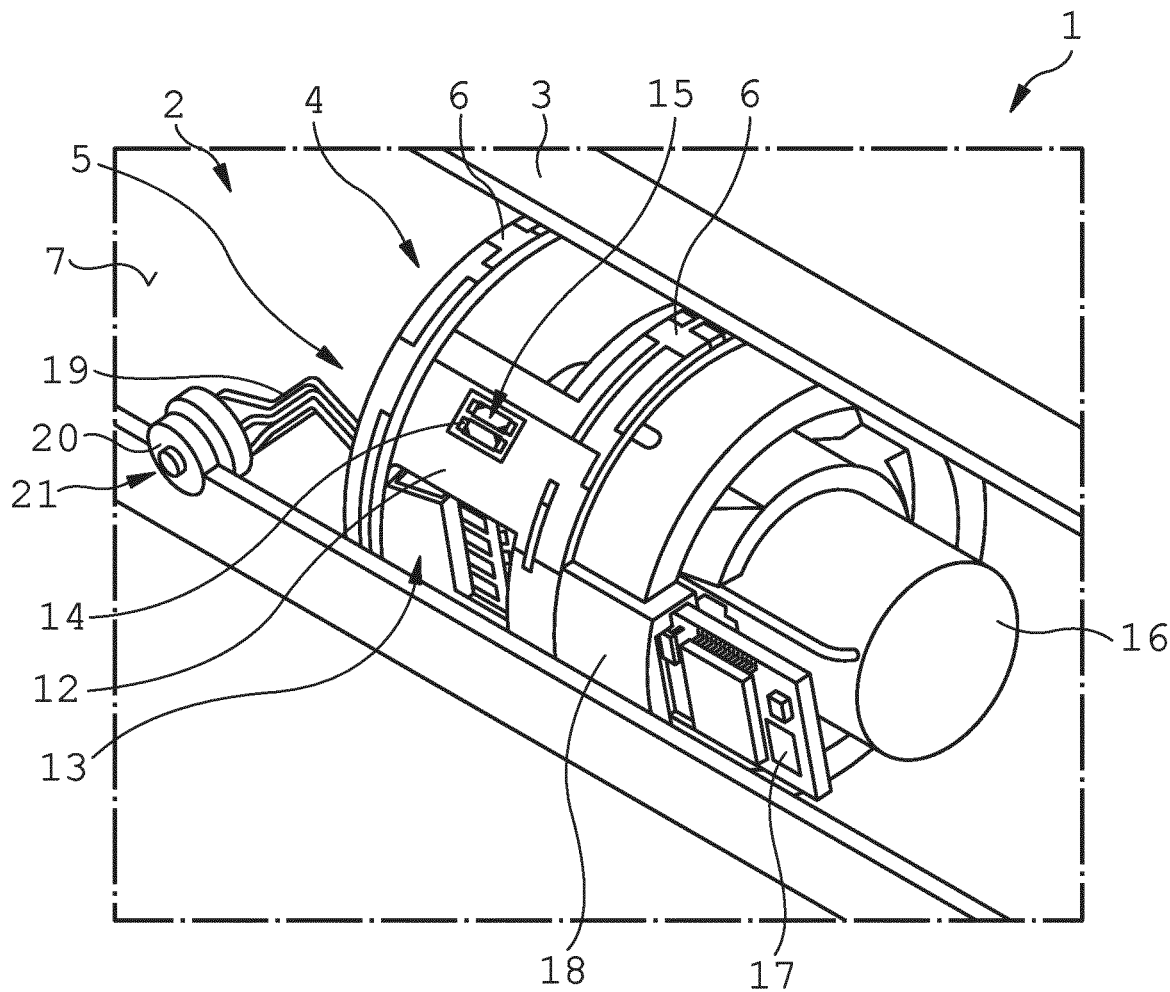
FIG. 1 shows a perspective view of a measuring device in a cylindrical interior of a tubular hollow body shown partially cut away.

FIG. 1 shows a measuring device 1 in an approximately cylindrical interior section 2 of a tubular hollow body 3, which in this embodiment is a steel tube. The hollow body 3 can be part of a machine or a larger system. The measuring device 1 can detect, process, send and, if necessary, also record physical measured variables and forces acting on the hollow body 3.

In order for the measuring device 1 to be able to precisely detect the desired measured variables in the approximately cylindrical interior section 2 of the hollow body 3, the measuring device 1 must be non-positively fixed in the hollow body 3 in order to be deformed accordingly when the hollow body 3 is mechanically loaded, so that this deformation can be detected with suitable sensors. After insertion and fixing of the measuring device 1 in the hollow body 3, no significant relative movement of the measuring device 1 to the hollow body 3 can occur, which could result in a distortion of the measurement of the mechanical load acting on the hollow body 3.

The measuring device 1 has a deformation body 4, on the respective opposite ends 5 of which a press-in ring element 6 is formed. The press-in ring elements 6 are subjected to elastic deformation during the insertion of the measuring device 1 into the cylindrical interior section 2 with a pressing-in process and thereby press with a restoring force against an inner wall 7 of the approximately cylindrical interior section 2. Both press-in ring elements 6 have a respective ring element thickness 11 that is so low over the entire circumference that the press-in ring element 6 adapts to a shaping of the inner wall 7 of the hollow body 3 and presses itself in a force-fitting manner against the inner wall 7 due to the restoring forces generated by the elastic deformation. This elastic deformation makes it possible to also fix the measuring device 1 in hollow bodies 3 that do not have a fit adapted to the measuring device 1 but have the manufacturing tolerances usual in many fields.

Figure 2:
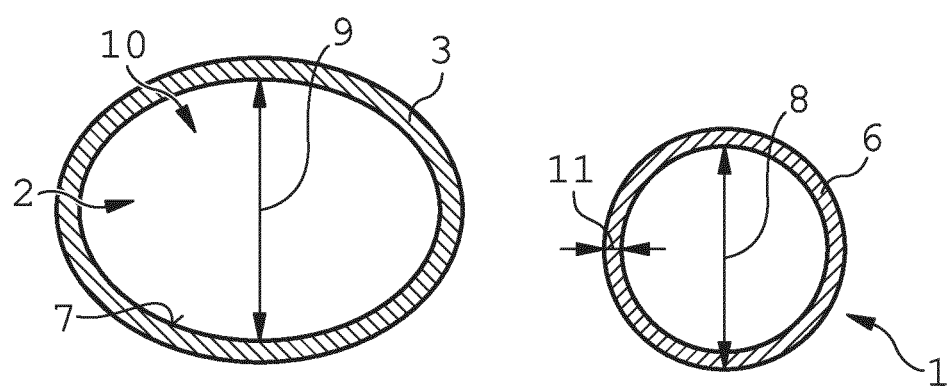
FIGS. 2 and 3a show a sectional view of a schematic representation of a steel tube as a hollow body and a press-in ring element of the measuring device, each in an unconnected state and in a connected state in which the press-in ring element is pressed into the approximately cylindrical interior of the hollow body.
Figure 3A:
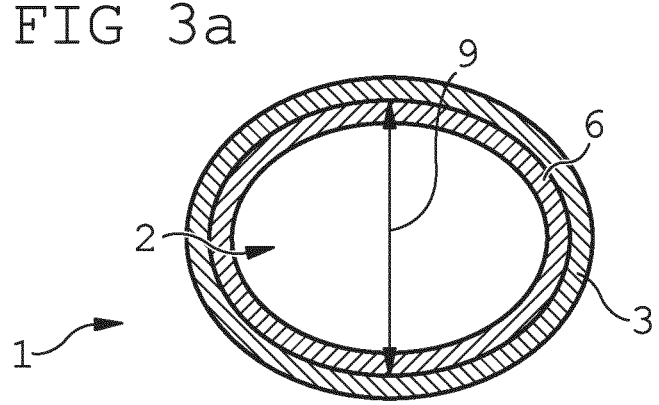

FIGS. 2 and 3a illustrate the effect of the press-in ring elements 6 by schematically showing the only approximately cylindrical interior section 2 of the tubular hollow body 3, which is shown with an exaggerated oval shape for clarification, the inner wall 7 of the hollow body 3 and only a single press-in ring element 6 of the measuring device 1 in a sectional view. FIG. 2 shows the hollow body 3 and a press-in ring element 6 shown next to it individually, even before the measuring device 1 is inserted into the interior section 2 of the hollow body 3. In this case, a ring element diameter 8 is larger than a smallest diameter 9 of the tubular hollow body 3 shown in an oval shape. If the press-in ring element 6 is inserted or pressed into the interior section 2 of the tubular hollow body 3 through a press-in opening 10, the press-in ring element 6 is thereby elastically and, if necessary, also plastically deformed and presses in a force-fitting manner against the inner wall 7 of the tubular hollow body 3, wherein the press-in ring element 6 pushes radially against the inner wall 7. FIG. 3a shows the hollow body 3 and the press-in ring element 6 fixed therein after the pressing-in process, wherein the force-fitting connection is maintained by a ring element thickness 11 of the press-in ring element 6 being at least 3% but not more than 25% of the ring element diameter 8. The restoring forces of the press-in ring elements 6 can be increased with a greater ring element thickness 11. With a smaller ring element thickness 11, a stronger deformation of the press-in ring elements 6 and thus a better adaptation to the inner wall 7 can be achieved, should the inner wall 7 deviate significantly from an ideal circular shape in cross-section.

Figure 3B:
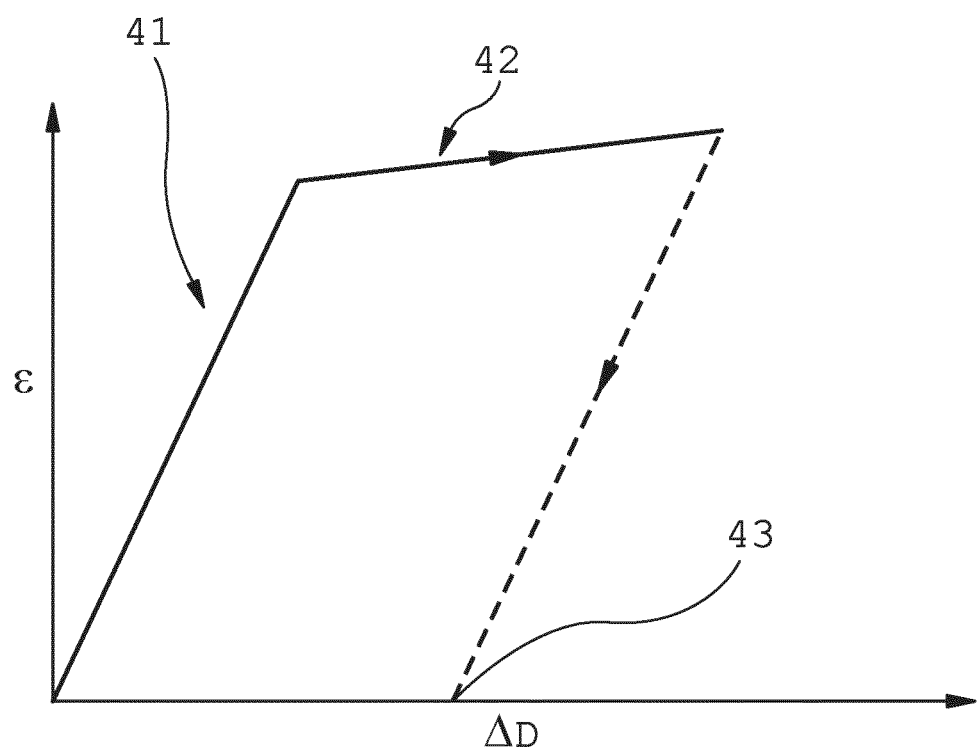
FIG. 3b shows a radial expansion curve c of the press-in ring elements plotted against an interference AD of FIG. 2 or FIG. 3b.

FIG. 3b shows the pressing-in process of the measuring device 1 in the form of a radial expansion curve c of the press-in ring elements to FIG. 2 or 3b, plotted against an interference AD. With an elastic design of the press-in ring elements 6 with a small interference, the press-in ring elements 6 are located in an elastic region 41 of the curve. If the press-in ring elements 6 are designed in such a way that the ring element diameters exceed a certain interference, the press-in ring elements 6 are located in a plastic region 42 of the curve, wherein there is a sustained residual compression 43 and plastic deformation of the press-in ring elements 6, even if the press-in ring elements 6 are removed from the interior section 2 again.

FIG. 1 further shows that the one-piece deformation body 4 has, in addition to the press-in ring elements 6, four deformation webs 12 that form a deformation region 13 of the deformation body 4. A strain gauge arrangement 14 is attached to each deformation web 12, wherein two opposing strain gauge arrangements 14 are electrically conductively connected to form a full bridge known as a Wheatstone bridge, so that undesirable force components acting on the strain gauges 14 can be determined and, if necessary, compensated for. All strain gauge arrangements 14 together form a sensor device 15 that can detect mechanical effects on the hollow body 3 via the press-in ring elements 6 and via the deformation region 13 to which the sensor device 15 is fixed.

FIG. 1 also shows that the measuring device 1 has an electrical energy store 16 that can supply an electronic processing device 17. In FIG. 1, the electronic processing device 17 has evaluation electronics that read and process the physical measured variables of the sensor device 15. All these components, respectively the electrical energy store 16 and the electronic processing device 17, are mechanically fixed by a plastic holder 18 and are thereby held together. The electrical energy store 16 is charged via a supply line 19, which leads to a connector 20, which is accessible from the outside via a drilled hole 21 formed in the hollow body 3.

FIG. 4 shows an alternative design of the measuring device 1 in a likewise approximately cylindrical interior section 2 of a tubular hollow body 3. As the diameter of the cavity circumference 9 in this hollow body 3 is smaller than in the hollow body 3 shown as an example in FIG. 1, the components of the measuring device 1 are arranged one behind the other in an axial direction in a space-saving manner, wherein they are held together by the plastic holder 18. From the press-in opening 10, the measuring device 1 can be guided far into the interior section 2 of the hollow body 3 and pressed in, wherein a centering ring element 22 ensures better guidance of the measuring device 1 while being pressed in. Due to the centering ring element 22, the deformation body 4 to be inserted cannot easily tilt, which can prevent the measuring device 1 from being pressed in crookedly.

In addition to the centering ring element 22, the press-in ring elements 6 each have a press-in chamfer 24 directed in the pressing-in direction 23, with which the press-in ring elements 6 of the deformation body 4 can be pressed more easily into the interior section 2 of the hollow body 3.

The measuring device 1 in FIG. 4 also has a radio transmission module (not shown in more detail) to which an antenna 25 is connected in the vicinity of the connector 20, with which wireless communication can take place between the measuring device 1 and an external data receiver outside the hollow body 3.

FIG. 5a shows the deformation body 4 of the measuring device 1 in more detail in a side view and in a perspective view. The deformation body 4 has a ring element thickness 11 that is in a range of 3% to 25% of the ring element diameter 8, wherein the frictional connection with the inner wall 7 of the tubular hollow body 3 is in each case more robust and reliable the greater the ring element thickness 11. In the side view of the deformation body 4, starting from the right, the centering ring element 22 is shown, the diameter of which is smaller than the ring element diameter 8 of the press-in ring elements 6, so that this region can be inserted into the cylindrical interior section 2 of the hollow body 3 without exerting force, thereby serving as a centering aid so that the deformation body 4 does not tilt during insertion into the hollow body 3. The press-in chamfers 24 on the press-in ring elements 6 are also shown in the pressing-in direction 23, wherein the press-in ring elements 6 delimit the deformation region 13 on both sides and transmit mechanical forces acting on the hollow body 3 to the deformation region 13. The deformation region 13 comprises four deformation webs 12, on each of which a strain gauge arrangement 14 is arranged, and which convert the acting force components into an electrical resistance change.

Figure 5B:
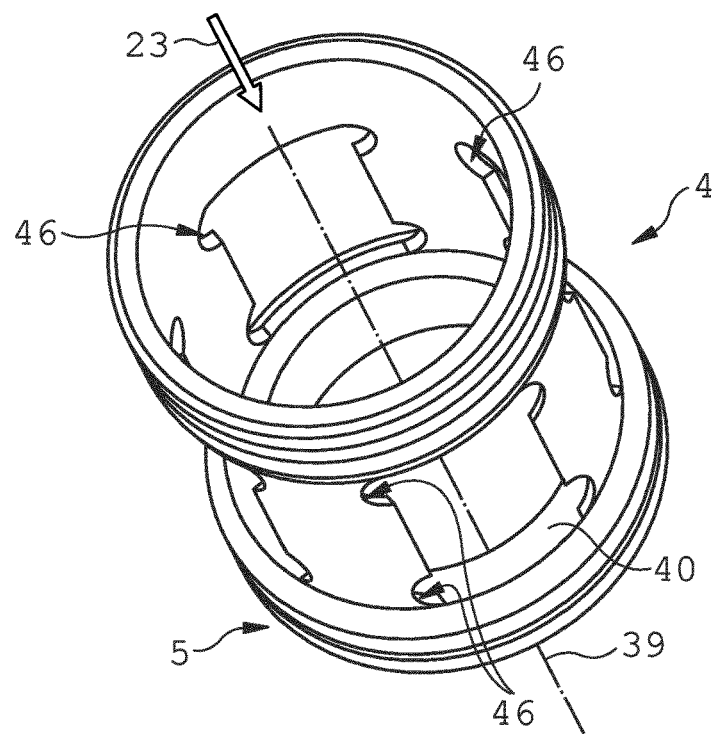
FIG. 5b shows a perspective view of a design of a deformation body having contact surfaces.

FIG. 5b shows, in addition to FIG. 5a, a deformation body 4 in a perspective view in which a contact surface 40 projecting radially inwards relative to a longitudinal axis 39 of the deformation body 4 can be seen, which contact surface 40 is associated with the end 5 of the deformation body 4 lying in the pressing-in direction 23, so that a press-in tool can bear against the at least one projecting contact surface 40 and press the measuring device 1 into the interior section 2 in the pressing-in direction 23. This allows the deformation body 4 to be pressed into the interior section 2 of the hollow body 3 without causing damage. FIG. 5b further shows how the deformation webs 12 have a plurality of sectional taperings 46 of the deformation webs so that the linearity of the measuring device can be improved.

Figure 5C:
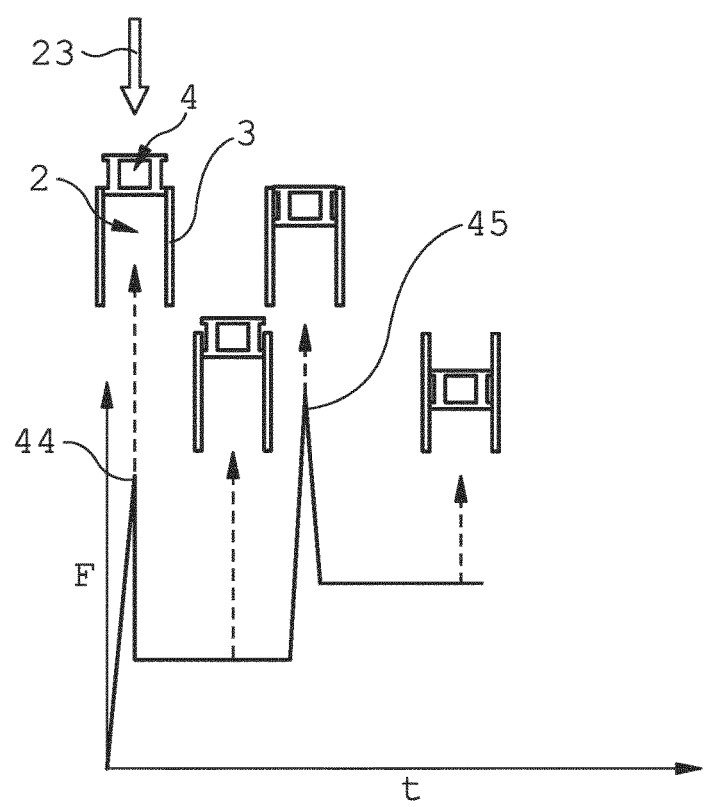
FIG. 5c shows a force curve F over a time t of a pressing-in process of a deformation body into the interior section of a hollow body.

In addition to FIGS. 5a and 5b, FIG. 5c also shows a force curve F over a time t during the pressing-in process of the deformation body 4. Initially, a first force peak 44 must be applied until the deformation body 4 enters the interior section 2 of the hollow body 3. Thereafter, a lower force than the first force peak 44 must be applied for pressing in until the second press-in ring element 6 has to be pressed into the interior section 2 of the hollow body 3. For this to happen, a second force peak 45 must be applied, which must be even higher than the first force peak 44. Subsequently, a reduced force F is required to move the deformation body 4 to its target position.

Figure 6:
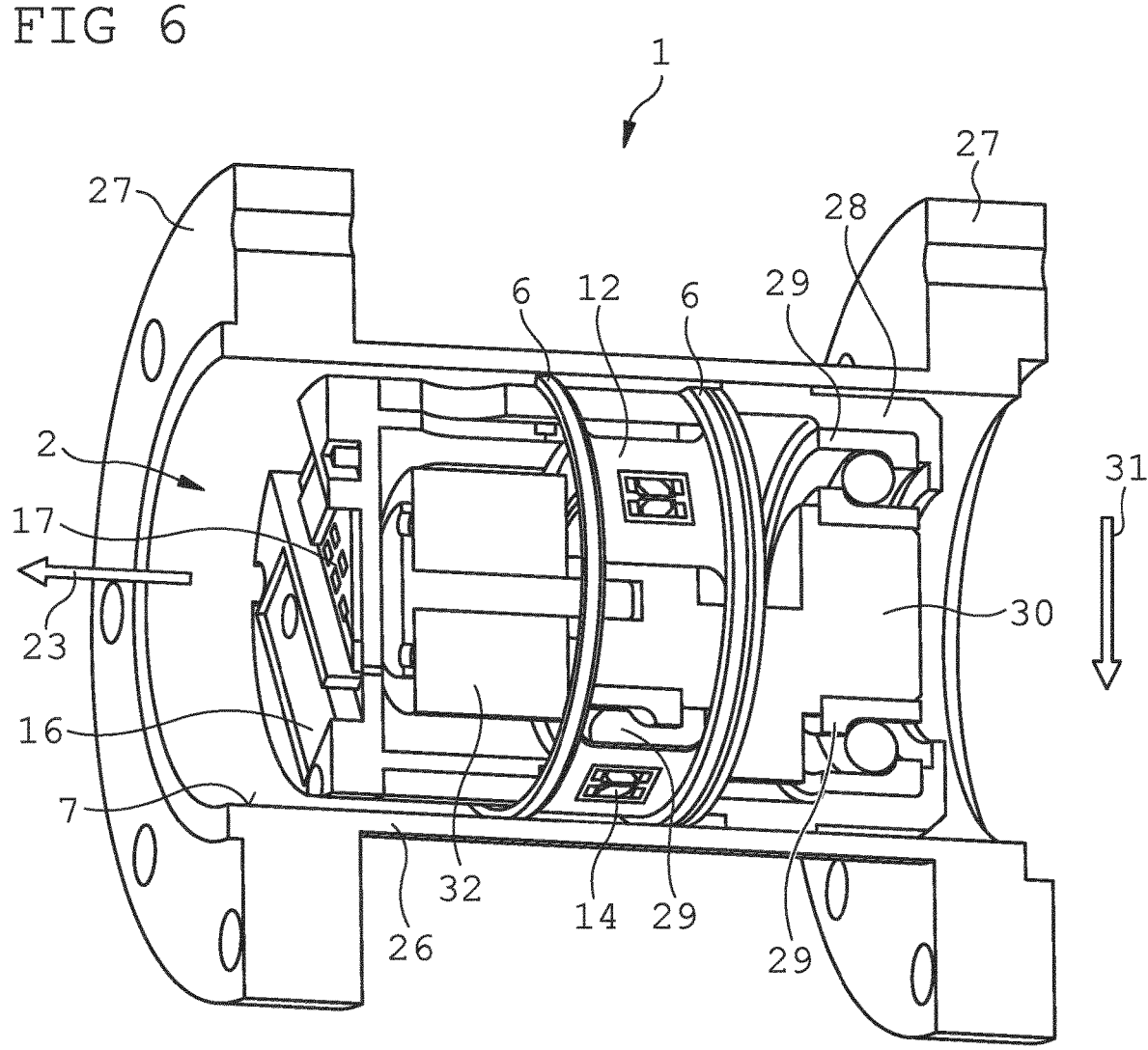
FIG. 6 shows a partially cut view of a measuring device, again with a different design, in a torque transducer for a drive shaft having an unbalance receptacle, a generator weight and an electrical generator.

FIG. 6 shows an alternative design of the measuring device 1 for rotating applications, wherein the measuring device 1 is arranged and fixed within a torque transducer 26, which can be connected to two opposite flanges 27; for example, between two drive shaft sections (not shown). The asymmetrical division of the components of the measuring device 1 can lead to dynamic imbalances during the rotation of the torque transducer 26, which is why the measuring device 1 has a balance receptacle 28 made of plastic for a compensating mass element (not shown in more detail), so that the imbalance is at least partially compensated and the rotation of the torque transducer 26 is not unduly impaired by the measuring device 1. The plastic balance receptacle 28 is particularly advantageous as it does not hinder the insertion and pressing-in of the measuring device 1 and torques acting on the torque transducer 26 are cushioned or are only transmitted to the deformation region 13 via the press-in ring elements 6.

Decoupled via two roller bearings 29, the balance receptacle 28 also has a generator weight 30 to which a permanent-magnet rotor 32 is fixed, wherein the permanent magnets induce a voltage in a coil winding of the rotatable measuring device 1. The rotational energy generated during a rotation of the torque transducer 26 can thereby be converted into electrical energy that can be used to operate the electrical processing device 17. This enables self-sufficient operation of the measuring device 1, which is no longer dependent on electrical energy from outside the torque transducer 26.

Figure 7:
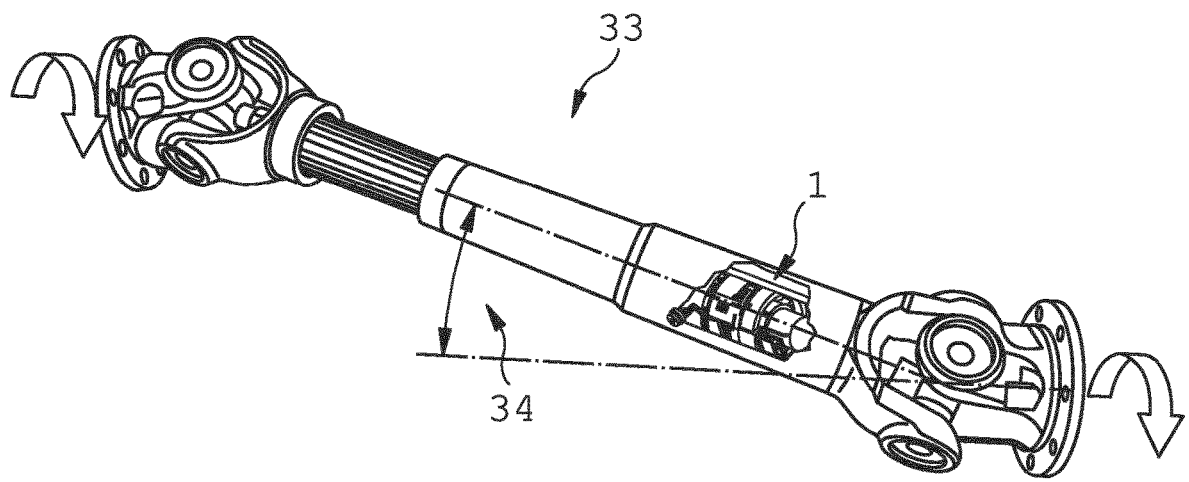
FIG. 7 shows an exemplary application of a measuring device in a universal joint shaft.

FIG. 7 shows an exemplary application of the measuring device 1, which is integrated into a universal joint shaft 33. In this case, the measuring device 1 can already be accommodated in a semi-finished product of a steel tube of the universal joint shaft 33, which can then be further processed into a component of the universal joint shaft 33 as part of the production process. Within the semi-finished product the measuring device 1 is protected from subsequent production steps such as welding, painting, sandblasting, drilling, milling, turning, pipe bending, crimping, etc. An inertial measuring unit in the measuring device 1 can, for example, detect a buckling angle 34 of the universal joint shaft 33 during operation, with which the operational stability of the universal joint shaft 33 can be monitored.

Figure 8:
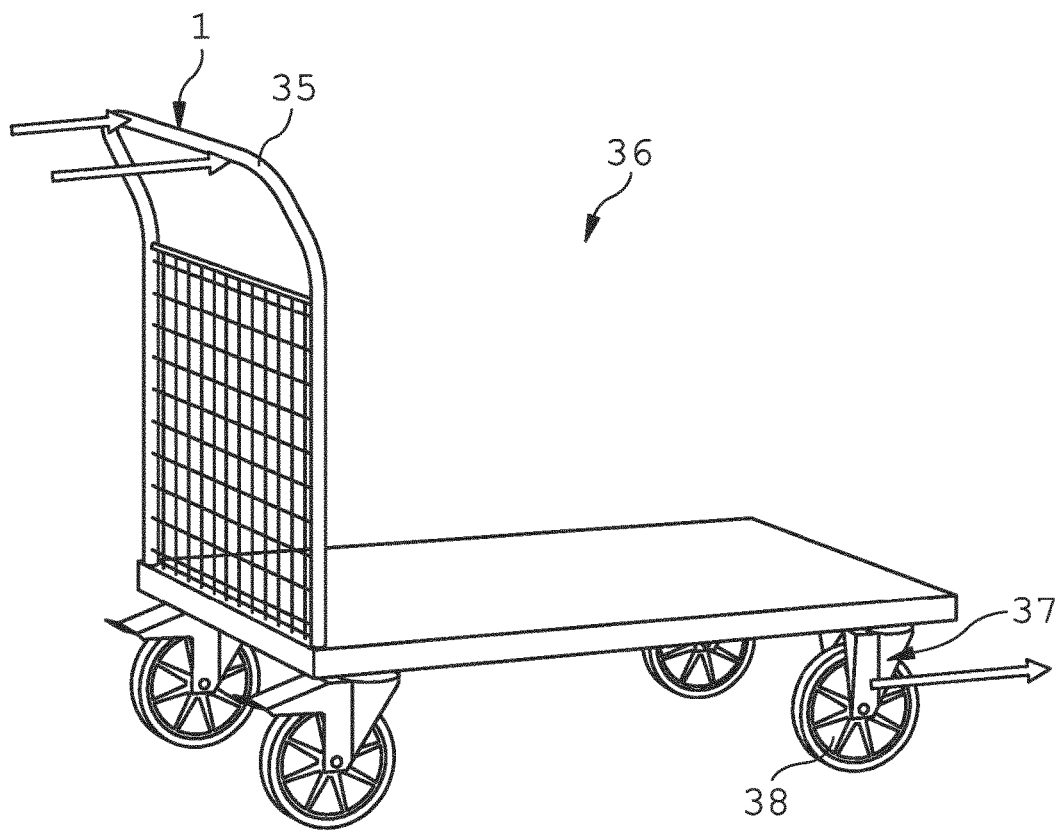
FIG. 8 shows an exemplary application of a measuring device in a rollable transport trolley.

FIG. 8 shows an alternative exemplary application of the measuring device 1, wherein this measuring device is located in a handle 35 of a rollable transport trolley 36. If a user presses the handle 35 with a certain force in the direction of the desired movement, the measuring device 1 detects the force acting on the hollow body 3 formed as the handle 35, processes the measured variable and can send a corresponding output signal to a drive motor 37, which can drive at least one of the trolley wheels 38. In this way, the measuring device 1 with the drive motors 37 has a driving-assisting effect. The exemplary application is not limited to only rollable transport trolleys 36, but can also be easily adapted to electrically driven bicycles or pushchairs, for example.

LIST OF REFERENCE NUMERALS

1. Measuring device
2. Cylindrical interior section
3. Hollow body
4. Deformation body
5. Ends of the deformation body
6. Press-in ring element
7. Inner wall of the tubular cavity
8. Ring element diameter
9. Cavity circumference
10. Press-in opening
11. Ring element thickness
12. Deformation webs
13. Deformation region
14. Strain gauge arrangement
15. Sensor device
16. Electrical energy store
17. Electronic processing device
18. Plastic holder
19. Supply line
20. Plug connector
21. Borehole
22. Centering element
23. Pressing-in direction
24. Press-in chamfer
25. Antenna
26. Torque transducer
27. Flange
28. Balance receptacle
29. Rolling bearing
30. Generator weight
31. Gravity
32. Permanent-magnet rotor
33. Universal joint shaft
34. Buckling angle
35. Handle
36. Rollable transport trolley
37. Drive motor
38. Trolley wheels
39. Longitudinal axis of the deformation body
40. Contact surfaces for a press-in tool
41. Elastic region
42. Plastic region
43. Residual compression
44. First force peak
45 Second force peak
46. Tapering of the deformation webs

The invention claimed is:

1. A measuring device (1) for detecting a mechanical stress of a hollow body (3) having a cylindrical interior section (2), comprising:
   a deformation body (4) that can be fixed in a force-transmitting manner in the cylindrical interior section (2), the deformation body (4) having a deformation region (13);
   a sensor device (15), which is fixed in the deformation region (13) and can detect a mechanical stress transmitted to the deformation body (4) due to the mechanical stress of the hollow body (3) and thereby forced deformation of the deformation region (13) of the deformation body (4); and
   two elastically deformable press-in ring elements (6) arranged at opposite ends (5) of the deformation body (4),
   wherein each press-in ring element (6) has a ring element thickness (11) in at least some regions that is so low that the respective press-in ring element (6) adapts to an inner wall (7) of the hollow body (3) and is pressed in a force-fitting manner against the inner wall (7), so that a mechanical stress on the hollow body (3) is transmitted via the press-in ring elements (6) to the deformation body (4) and causes a deformation of the deformation region (13) of the deformation body (4) that can be detected by the sensor device (15),
   wherein the deformation region (13) of the deformation body (4) consists of deformation webs (12) that connect the two press-in ring elements (6) and to which the sensor device (15) is fixed, and
   wherein the sensor device (15) comprises strain gauges (14), wherein the strain gauges (14) are fixed in the deformation region (13) of the deformation body (3) and, if appropriate, on the deformation webs (12).

2. The measuring device (1) according to claim 1, wherein the low ring element thickness (11) of the press-in ring elements (6) relative to a respective ring element diameter (8) of the press-in ring elements (6) is predetermined in a range of 3% to 25%.

3. The measuring device (1) according to claim 1, wherein the press-in ring elements (6) are made of a material that allows plastic deformation when forced beyond an elastic limit.

4. The measuring device (1) according to claim 1, wherein the deformation webs (12) connecting the two press-in ring elements (6) are tapered in at least some regions along a respective longitudinal axis of the deformation webs (12).

5. The measuring device (1) according to claim 1, wherein at least one circumferential edge of each of the two press-in ring elements (6) has a press-in chamfer (24), so that the deformation body (4) can be introduced into the cylindrical interior (2) of the hollow body (3) with the press-in chamfer (24) of the press-in ring elements (6) in front.

6. The measuring device (1) according to claim 1, wherein the measuring device (1) comprises an electronic processing device (17), which prepares and processes measurement signals from the sensor device (15).

7. The measuring device (1) according to claim 1, wherein the measuring device (1) has a radio transmission module with which wireless communication can take place.

8. The measuring device (1) according to claim 1, wherein a recess is made in the hollow body (3), into which recess an antenna device adapted to the recess and mounted on a printed circuit board is fitted, wherein the antenna device is enclosed by a sleeve sealing the recess.

9. The measuring device (1) according to claim 8, wherein a permanent-magnet rotor (32) is fixed to a generator weight (30), wherein the generator weight (30) and the permanent-magnet rotor (32) are mounted inside the measuring device (1) by means of rolling bearings (29), so that a rotational movement of the measuring device (1) about the permanent-magnet rotor (32) mounted in rolling bearings (29) can generate an electrical voltage in at least one coil winding fixed to the rotatable measuring device (1).

10. The measuring device (1) according to claim 1, wherein the measuring device (1) has an unbalance receptacle (28) with which a compensating mass element can be fixed to the deformation body (3).

11. The measuring device (1) according to claim 1, wherein the measuring device (1) has at least one inertial measurement unit that can record rotation rate and/or acceleration measurement values.

12. A measuring device (1) for detecting a mechanical stress of a hollow body (3) having a cylindrical interior section (2), comprising:
a deformation body (4) that can be fixed in a force-transmitting manner in the cylindrical interior section (2), the deformation body (4) having a deformation region (13);
a sensor device (15), which is fixed in the deformation region (13) and can detect a mechanical stress transmitted to the deformation body (4) due to the mechanical stress of the hollow body (3) and thereby forced deformation of the deformation region (13) of the deformation body (4); and
two elastically deformable press-in ring elements (6) arranged at opposite ends (5) of the deformation body (4),
wherein each press-in ring element (6) has a ring element thickness (11) in at least some regions that is so low that the respective press-in ring element (6) adapts to an inner wall (7) of the hollow body (3) and is pressed in a force-fitting manner against the inner wall (7), so that a mechanical stress on the hollow body (3) is transmitted via the press-in ring elements (6) to the deformation body (4) and causes a deformation of the deformation region (13) of the deformation body (4) that can be detected by the sensor device (15), and
wherein the end (5) of the deformation body (4) lying in a pressing-in direction (23) has at least one contact surface (40) projecting radially inwards relative to a longitudinal axis (39) of the deformation body (4), so that the measuring device (1) can be pressed into the interior section (2) in the pressing-in direction (23) with a press-in tool bearing against the at least one projecting contact surface (40).

13. The measuring device (1) according to claim 12, wherein the deformation region (13) of the deformation body (4) consists of deformation webs (12) that connect the two press-in ring elements (6) and to which the sensor device (15) is fixed.

14. The measuring device (1) according to claim 13, wherein the sensor device (15) comprises strain gauges (14), wherein the strain gauges (14) are fixed in the deformation region (13) of the deformation body (3) and, if appropriate, on the deformation webs (12).

15. A measuring device (1) for detecting a mechanical stress of a hollow body (3) having a cylindrical interior section (2), comprising:
a deformation body (4) that can be fixed in a force-transmitting manner in the cylindrical interior section (2), the deformation body (4) having a deformation region (13);
a sensor device (15), which is fixed in the deformation region (13) and can detect a mechanical stress transmitted to the deformation body (4) due to the mechanical stress of the hollow body (3) and thereby forced deformation of the deformation region (13) of the deformation body (4); and
two elastically deformable press-in ring elements (6) arranged at opposite ends (5) of the deformation body (4),
wherein each press-in ring element (6) has a ring element thickness (11) in at least some regions that is so low that the respective press-in ring element (6) adapts to an inner wall (7) of the hollow body (3) and is pressed in a force-fitting manner against the inner wall (7), so that a mechanical stress on the hollow body (3) is transmitted via the press-in ring elements (6) to the deformation body (4) and causes a deformation of the deformation region (13) of the deformation body (4) that can be detected by the sensor device (15),
wherein the low ring element thickness (11) of the press-in ring elements (6) relative to a respective ring element diameter (8) of the press-in ring elements (6) is predetermined in a range of 3% to 25%, and
wherein a centering ring element (22) with a smaller diameter than the ring element diameter (8) is fixed to at least one end face (5) of the deformation body (4), so that the centering ring element (22) can be introduced more easily into the cylindrical interior (2) of the hollow body (3) and provides advantageous positioning and alignment of the press-in ring element (6) that is subsequently pressed into the cylindrical interior (2).

* * * * *